United States Patent
Li et al.

(10) Patent No.: US 11,711,015 B2
(45) Date of Patent: Jul. 25, 2023

(54) SWITCHING CONVERTER WITH QUASI-RESONANT CONTROL AND CONTROL METHOD THEREOF

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 118 days.

(21) Appl. No.: 17/546,921

(22) Filed: Dec. 9, 2021

(65) Prior Publication Data

US 2022/0209665 A1    Jun. 30, 2022

(30) Foreign Application Priority Data

Dec. 31, 2020  (CN) ......................... 202011622760.8

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05); *H02M 1/0025* (2021.05)

(58) Field of Classification Search
CPC ... H02M 3/156; H02M 1/0009; H02M 1/0025
See application file for complete search history.

(56) References Cited

U.S. PATENT DOCUMENTS

| | | | |
|---|---|---|---|
| 9,065,348 B2 | 6/2015 | Wang et al. | |
| 9,093,909 B2 | 7/2015 | Wang et al. | |
| 9,407,155 B2 | 8/2016 | Wang et al. | |
| 9,595,885 B2 | 3/2017 | Wang et al. | |
| 10,348,182 B2 | 7/2019 | Wang | |
| 10,804,806 B1* | 10/2020 | Finkel | H02M 3/33507 |
| 2019/0252985 A1* | 8/2019 | Radic | H03K 7/08 |
| 2020/0287457 A1* | 9/2020 | Su | H02M 3/01 |
| 2022/0140741 A1* | 5/2022 | Lin | H02M 1/0032 |
| | | | 363/17 |

OTHER PUBLICATIONS

U.S. Appl. No. 17/474,698, filed Sep. 14, 2021, Hangzhou MPS Semiconductor Technology Ltd.

* cited by examiner

*Primary Examiner* — Jue Zhang
*Assistant Examiner* — Lakaisha Jackson
(74) *Attorney, Agent, or Firm* — Perkins Coie LLP

(57) ABSTRACT

A controller of a switching converter includes an error amplifying circuit, a first comparison circuit, a valley detection circuit, a valley selection circuit and a frequency control circuit. The error amplifying circuit generates a compensation signal based on the difference between a reference signal and a feedback signal. The first comparison circuit compares the compensation signal with a modulation signal and generates a pulse frequency modulation signal. The valley detection circuit detects valleys of a resonant voltage of the switching converter and generates a valley pulse signal. The valley selection circuit generates a valley enable signal corresponding to a target valley number based on the pulse frequency modulation signal and the valley pulse signal. The frequency control circuit generates a frequency control signal to control the switching frequency of the first switch based on the valley enable signal and the valley pulse signal.

23 Claims, 10 Drawing Sheets

SWITCHING CONVERTER WITH QUASI-RESONANT CONTROL AND CONTROL METHOD THEREOF

CROSS-REFERENCE TO RELATED APPLICATIONS

This application claims the benefit of CN application 202011622760.8 filed on Dec. 31, 2020, and incorporated herein by reference.

TECHNICAL FIELD

The present invention generally relates to electronic circuits, and more particularly but not exclusively to switching converters with quasi-resonant control and control methods thereof.

BACKGROUND

There are two main control methods used in a switching converter. One is fixed frequency control and the other is variable frequency control. Although the fixed frequency control is widely adopted, it suffers from high switching loss and efficiency variation with load or input voltage. These disadvantages are overcome by the variable frequency control.

An example of the variable frequency control is quasi-resonant control. FIG. 1 illustrates example waveforms of a switching converter with quasi-resonant control. The switching converter with quasi-resonant control works under CRM (critical-current-mode), which means once a current flowing through an energy storage component reaches zero, a switch is turned on to increase the current flowing through an energy storage component. When a current sense signal Ics indicative of the current flowing through the energy storage component decreases to zero, the energy storage component resonates with the parasitic capacitance of the switch. The switch is turned on by a switching control signal PG when a voltage VDS across the switch reaches its resonant valley (valley point of the voltage VDS during resonance) which is called valley switching, so as to reduce the switching loss. The switch is turned off by the switching control signal PG when the current sense signal Ics reaches a threshold Vfb, which may be a feedback signal related to an output voltage of the switching converter.

However, the switching converter with quasi-resonant control in the art could generate audio noise and/or discontinuous output power, due to the valley jumping back and forth between two adjacent valleys through loop adjustment.

SUMMARY

Embodiments of the present invention are directed to controllers used in a switching converter. The switching converter has a first switch and an energy storage component coupled to the first switch. The controller comprises an error amplifying circuit, a first comparison circuit, a valley detection circuit, a valley selection circuit and a frequency control circuit. The error amplifying circuit is configured to generate a compensation signal based on the difference between a reference signal and a feedback signal indicative of an output signal of the switching converter. The first comparison circuit compares the compensation signal with a modulation signal generated by a modulation signal generator and generates a pulse frequency modulation signal. The valley detection circuit detects valleys of a resonant voltage of the switching converter and generates a valley pulse signal. The valley selection circuit is configured to receive the pulse frequency modulation signal and the valley pulse signal, and the valley selection circuit generates a target valley number of a subsequent switching cycle and a valley enable signal corresponding to the target valley number based on the pulse frequency modulation signal and the valley pulse signal. The frequency control circuit is configured to generate a frequency control signal to control the switching frequency of the first switch based on the valley pulse signal and the valley enable signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the following descriptions, a flyback converter is used as an example to explain the working principle of the present invention. However, persons skilled in the art can recognize that it is not intended to limit the invention. The present invention may be applied to any other suitable switching converters.

Figure 1:
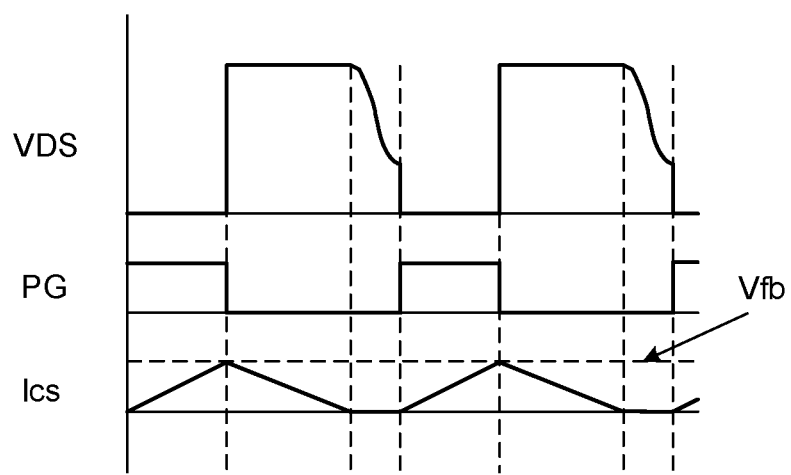
FIG. 1 illustrates example waveforms of a switching converter with quasi-resonant control.
Figure 2:
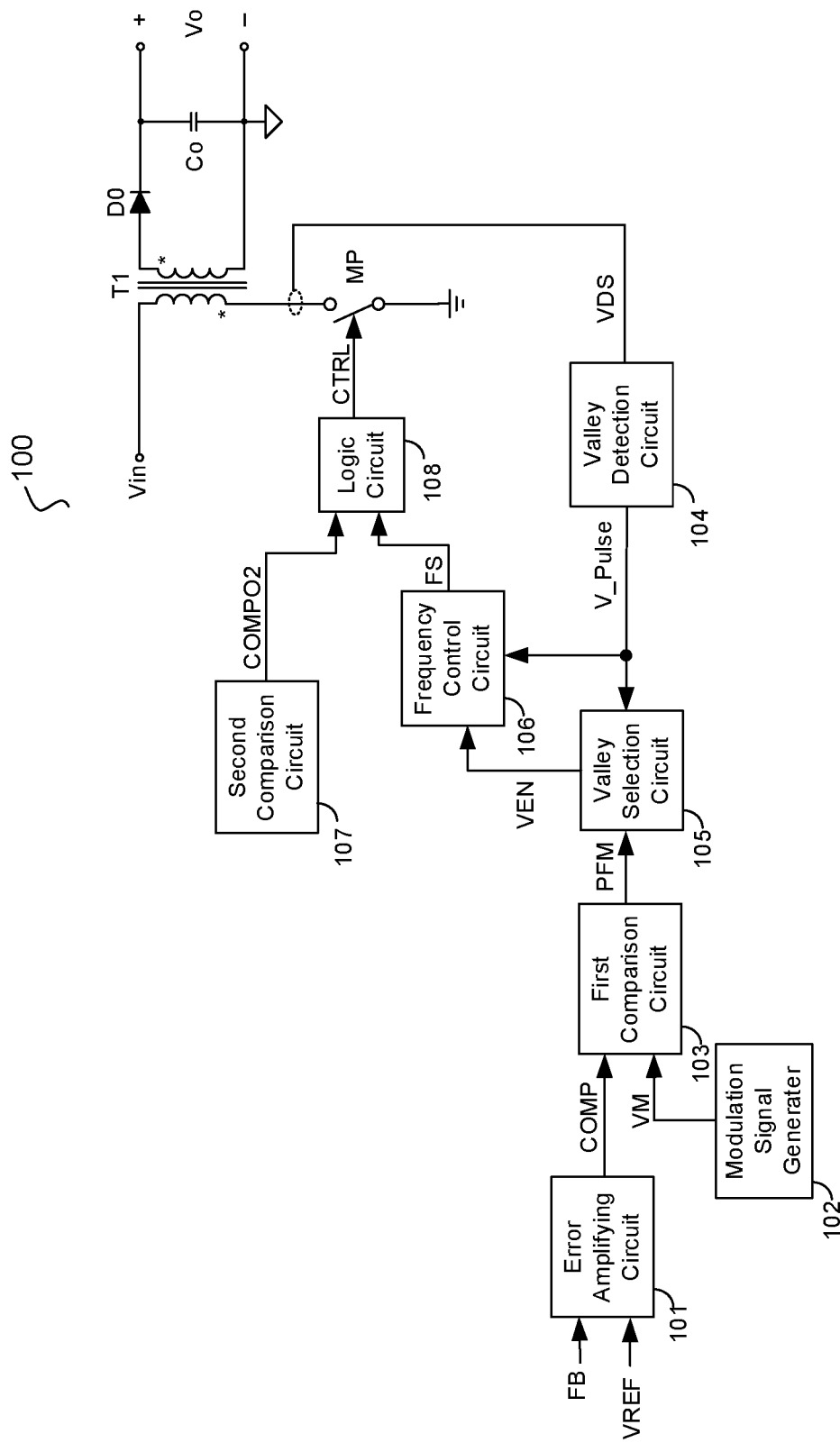
FIG. 2 illustrates a block diagram of a switching converter 100 with quasi-resonant control in accordance with an embodiment of the present invention.

FIG. 2 illustrates a block diagram of a switching converter 100 with quasi-resonant control in accordance with an embodiment of the present invention. As shown in FIG. 2, the switching converter 100 comprises a transformer T1, a main switch MP and a controller. The transformer T1 has a primary winding and a secondary winding with each of the windings having a first terminal and a second terminal. The first terminal of the primary winding is configured to receive an input voltage Vin, the first terminal of the secondary winding is configured to provide a DC output voltage Vo, the second terminal of the secondary winding is coupled to a secondary ground. The main switch MP is coupled between the second terminal of the primary winding and a ground. The controller receives a feedback signal FB indicative of an output signal (e.g. output voltage, output current or output power) of the switching converter 100 and generates a control signal CTRL to control the main switch MP based on the feedback signal FB, to convert an input voltage Vin into the output voltage Vo.

The controller comprises an error amplifying circuit 101, a modulation signal generator 102, a first comparison circuit 103, a valley detection circuit 104, a valley selection circuit 105, a frequency control circuit 106, a second comparison circuit 107 and a logic circuit 108. In some embodiments, the controller and the main switch MP are integrated in the same chip.

The error amplifying circuit 101 has a first input terminal, a second input terminal and an output terminal, wherein the first input terminal is configured to receive the feedback signal FB, the second input terminal is configured to receive a reference signal VREF. Based on the difference between the reference signal VREF and the feedback signal FB, the error amplifying circuit 101 generates a compensation signal COMP at the output terminal. The modulation signal generator 102 is configured to generate a modulation signal VM which may be saw tooth signal, triangular signal or any other suitable signals. The first comparison circuit 103 has a first input terminal, a second input terminal and an output terminal, wherein the first input terminal is coupled to the output terminal of the error amplifying circuit 101 to receive the compensation signal COMP, the second input terminal is coupled to the modulation signal generator 102 to receive the modulation signal VM. The first comparison circuit 103 compares the compensation signal COMP with the modulation signal VM and generates a pulse frequency modulation signal PFM at the output terminal.

In the example of FIG. 2, the valley detection circuit 104 is coupled to the main switch MP, and generates a valley pulse signal V_Pulse indicative of valleys of a resonant voltage of the switching converter. The valley selection circuit 105 has a first input terminal, a second input terminal and an output terminal, wherein the first input terminal is configured to receive the pulse frequency modulation signal PFM, the second input terminal is configured to receive the valley pulse signal V_Pulse, based on the pulse frequency modulation signal PFM and the valley pulse signal V_Pulse, the valley selection circuit 105 is configured to generate a target valley number of a subsequent switching cycle and a valley enable signal VEN corresponding to the target valley number.

The frequency control circuit 106 has a first input terminal, a second input terminal and an output terminal, wherein the first input terminal is configured to receive the valley pulse signal V_Pulse, the second input terminal is configured to receive the valley enable signal VEN, and based on the valley pulse signal V_pulse and the valley enable signal VEN, the frequency control circuit 106 provides the frequency control signal FS at the output terminal to control the switching frequency of the main switch MP.

As shown in FIG. 2, the second comparison circuit 107 has a first input terminal, a second input terminal and an output terminal, wherein when the first input terminal is configured to receive a current sensing signal VCS indicative of a current flowing through the main switch MP, the second input terminal is configured to receive a first threshold voltage VTH1. The second comparison circuit 107 compares the current sensing signal VCS and the first threshold voltage VTH1, generates a current comparison signal COMPO2. The first threshold voltage VTH1 may be a constant value or a variable value varying with the feedback signal FB. In another embodiment, the first threshold voltage VTH1 may be a variable value varying with an input line voltage.

The logic circuit 108 has a first input terminal, a second input terminal and an output terminal, wherein the first input terminal is configured to receive the frequency control signal FS, the second input terminal is configured to receive the current comparison signal COMPO2. Based on the frequency control signal FS and the current comparison signal COMPO2, the logic circuit 108 generates the control signal CTRL to control the main switch MP at the output terminal.

In some embodiments, the valley selection circuit 105 compares the number of pulses of the valley pulse signal V_Pulse during the period from when the main switch MP is turned on to when the rising edge of the pulse frequency modulation signal PFM arrives with a last cycle valley number, and generates the target valley number based on the comparison. The target valley number is determined to keep the last cycle valley number unchanged or to switch another valley number based on the comparison result. And when the number of pulses of the valley pulse signal V_Pulse exceeds the target valley number, the valley enable signal VEN is asserted, to ensure the valley switching and avoid the audio noise.

Figure 3:
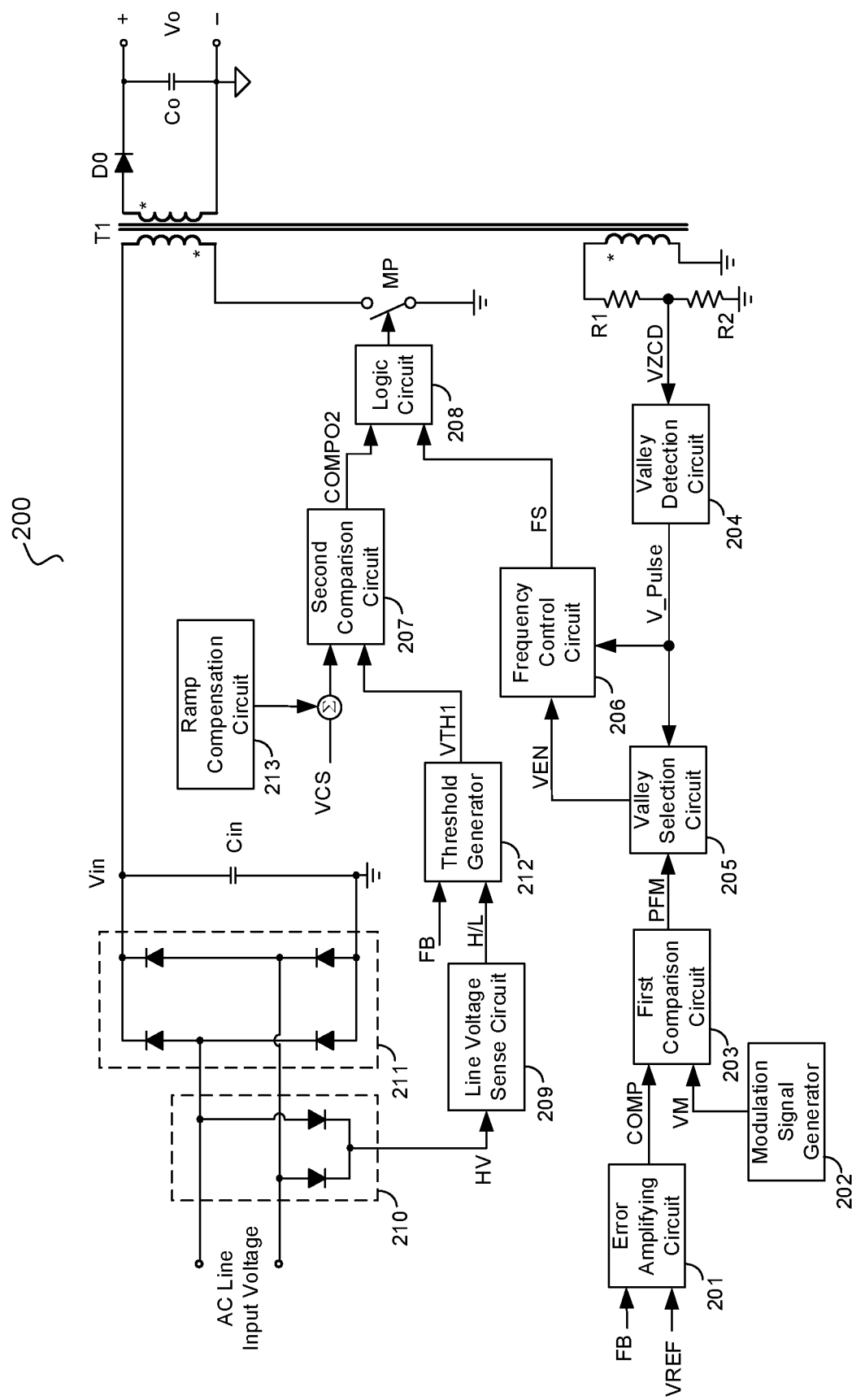
FIG. 3 illustrates a block diagram of a switching converter 200 with quasi-resonant control in accordance with another embodiment of the present invention.

FIG. 3 illustrates a block diagram of a switching converter 200 with quasi-resonant control in accordance with another embodiment of the present invention. In the example of FIG. 3, the switching converter 200 receives an AC input line voltage. The AC input line voltage is rectified by a first rectifying circuit 211 and subsequently is filtered by an input capacitor Cin, to provide the DC input voltage Vin at the first terminal of the primary winding of the transformer T1.

The switching converter 200 further comprises a line voltage sensing circuit 209. The line voltage sensing circuit 209 has an input terminal and an output terminal, wherein the input terminal is coupled to an output terminal of a second rectifying circuit 210 to receive a rectified signal HV, based on the rectified signal HV, the line voltage sensing circuit 209 generates a line mode signal H/L indicative of a high line mode or a low line mode of the line voltage. In detail, when the peak of the rectified signal HV is higher than a HV threshold voltage, e.g., 240 V, the line mode signal H/L is at logic high, to indicate the high line mode. When the peak of the rectified signal HV is less than a LV threshold voltage, e.g., 10 V, the line mode signal H/L is at logic low, to indicate the low line mode.

Compared with the switching converter 100 shown in FIG. 2, the switching converter 200 shown in FIG. 3 further comprises an auxiliary winding of the transformer T1. The voltage difference between the input voltage Vin and the voltage VDS across the main switch MP is proportionally reflected on the auxiliary winding. So in the example of FIG. 3, the valley detection circuit 204 is coupled to the auxiliary winding through a voltage divider consisted of resistors R1 and R2, and is configured to detect a reflected voltage VZCD on the auxiliary winding and generate the valley pulse signal V_Pulse corresponding to valleys of the resonant voltage.

In addition, the switching converter 300 further comprises a threshold generator 212. The threshold generator 212 has a first input terminal, a second input terminal and an output terminal, wherein the first input terminal is configured to receive the feedback signal FB, the second input terminal is configured to receive the line mode signal H/L, and the threshold generator 212 generates the first threshold voltage VTH1 at the output terminal.

Furthermore, the switching converter 200 further comprises a ramp compensation circuit 213 configured to compensate the current sensing signal VCS, the compensated current sensing signal is sent to the first input terminal of the second comparison circuit 207, to provide the current comparison signal COMPO2.

Figure 4:
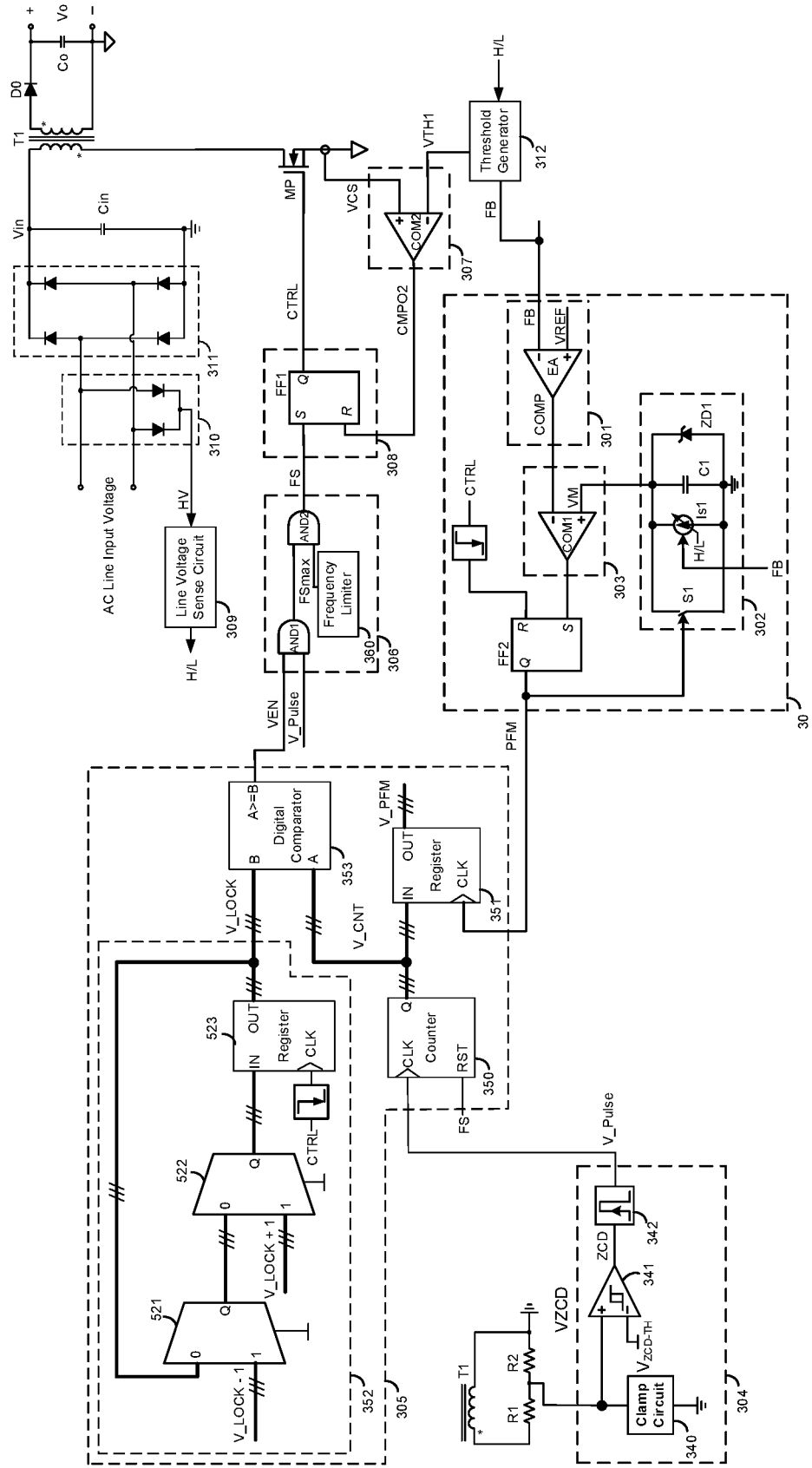
FIG. 4 illustrates a switching converter 300 with quasi-resonant control in accordance with an embodiment of the present invention.

FIG. 4 illustrates a switching converter 300 with quasi-resonant control in accordance with an embodiment of the present invention. In the example of FIG. 4, the switching converter 300 comprises a transformer T1, a main switch MP, an error amplifying circuit 301, a modulation signal generator 302, a first comparison circuit 303, a valley detection circuit 304, a valley selection circuit 305, a frequency control circuit 306, a second comparison circuit 307, a logic circuit 308, a line voltage sensing circuit 309, a first rectifying circuit 310, a second rectifying circuit 311 and a threshold generator 312. Wherein the error amplifying circuit 301, the modulation signal generator 302 and the first comparison circuit 303 consist a pulse frequency modulation circuit 30.

As shown in FIG. 4, the error amplifying circuit 406 comprises an error amplifier EA. The non-inverting input terminal of the error amplifier EA is configured to receive the feedback signal FB indicative of an output voltage Vout of the switching converter 300, the inverting input terminal is configured to receive the reference signal VREF, the output terminal is coupled to the first comparison circuit 303 to provide the compensation signal COMP.

The modulation signal generator 302 comprises a capacitor C1, a switch S1 and a current source IS1. The capacitor C1 has a first terminal and a second terminal, wherein the first terminal is coupled to the first comparison circuit 303 to provide the modulation signal VM, the second terminal is coupled to the ground. The switch S1 has a first terminal, a second terminal and a control terminal, wherein the first terminal is coupled to the first terminal of the capacitor C1, the second terminal is coupled to the ground, the control terminal is coupled to the output terminal of the first comparison circuit 303. The current source IS1 has an input terminal, a control terminal, a selection terminal and an output terminal, wherein the input terminal is coupled to the ground, the control terminal is coupled to receive the feedback signal FB, the selection terminal is configured to receive the line mode signal H/L, the output terminal is coupled to the first terminal of the capacitor C1. In one embodiment, the modulation signal generator 407 further comprises a Zener diode ZD1. The anode of the Zener diode ZD1 is coupled to the ground, the cathode is coupled to the first terminal of the capacitor C1. The modulation signal generator 302 is configured to set the frequency of the pulse frequency modulation signal PFM, wherein the switching cycle of frequency modulation signal PFM can be controlled by adjusting the capacitance of the capacitor C1 and the current source IS1.

The first comparison circuit 303 comprises a comparator COM1. The non-inverting input terminal of the comparator COM1 is coupled to the modulation signal generator 302 to receive the modulation signal VM, the inverting input terminal is coupled to the error amplifying circuit 301 to receive the compensation signal COMP, the output terminal is coupled to the valley selection circuit 305 through a flip-flop FF2 for providing the pulse frequency modulation signal PFM. When the main switch MP is turned off, i.e., the falling edge of the control signal CTRL arrives, the current source IS1 charges the capacitor C1 to generate the modulation signal VM and the pulse frequency modulation signal PFM.

Figure 5:
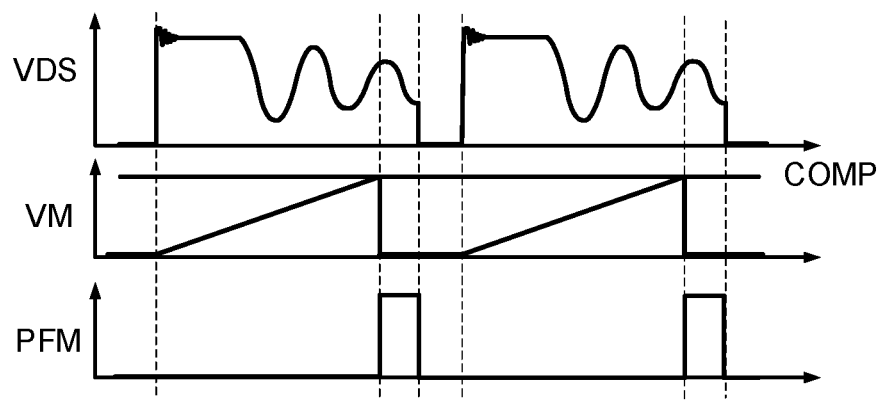
FIG. 5 illustrates working waveforms of a pulse frequency modulation circuit 30 in accordance with an embodiment of the present invention.

FIG. 5 illustrates working waveforms of a pulse frequency modulation circuit 30 in accordance with an embodiment of the present invention. As shown in FIG. 5, VDS represents the voltage across the main switch MP. When the main switch MP is turned off, the modulation signal VM starts to increase. When the modulation signal VM increases to the compensation signal COMP, the pulse frequency modulation signal PFM changes from logic low to logic high. At the same time, the output of the flip-flop FF2 is sent to the modulation signal generator 302, to discharge the capacitor C1.

In the example of FIG. 4, the frequency control circuit 306 comprises an AND gate AND1. The AND gate AND1 has a first input terminal, a second input terminal, and an output terminal, wherein the first input terminal is configured to receive the valley enable signal VEN, the second input terminal is configured to receive the valley pulse signal V_Pulse, and the AND gate AND1 provides the frequency control signal FS at the output terminal.

In order to limit the switching frequency of the switching converter 300, the frequency control circuit 306 further comprises a frequency limiter 360 and an AND gate AND2. The frequency limiter 360 is configured to provide a frequency limiting sigal Fsmax to limit the frequency of the frequency control signal FS. The frequency limiting signal Fsmax is reset when the main switch MP is turned on, and after a predetermined time, the AND gate AND2 is enabled and the main switch MP can be turned on. In one embodiment, the predetermined time is a minimum switching cycle of the main switch MP.

The second comparison circuit 307 comprises a comparator COM2. The non-inverting input terminal of the comparator COM2 is configured to receive the current sensing signal VCS or the compensated current sensing signal, the inverting input terminal is coupled to the threshold generator 312 to receive the first threshold voltage VTH1, the output terminal is configured to provide the current comparison signal COMPO2.

The logic circuit 308 comprises a flip-flop FF1. The flip-flop FF1 has a first input terminal, a second input terminal and an output terminal, wherein the first input terminal is coupled to the output terminal of the frequency control circuit 306 to receive the frequency control signal FS. The second input terminal is coupled to the second comparison circuit 307 to receive the current comparison signal COMPO2. The flip-flop FF1 provides the control signal CTRL of the main switch MP at the output terminal.

Referring still to FIG. 4, the valley detection circuit 304 comprises a clamp circuit 340, a hysteresis comparator 341 and a one-shot circuit 342. The clamp circuit 340 has a first terminal and a second terminal, wherein the first terminal is coupled to a first terminal of the auxiliary winding through the voltage divider. The second terminal of the auxiliary winding and the second terminal of the clamp circuit are coupled to the ground. The non-inverting input terminal of the hysteresis comparator 314 is coupled to the first terminal of the clamp circuit 340 to receive the reflected voltage VZCD, the inverting input terminal is configured to receive a reflected threshold voltage VZCD_TH, the output terminal is configured to provide the zero crossing detection signal ZCD. The one-shot circuit 342 has an input terminal and an output terminal, wherein the input terminal is coupled to the output terminal of the hysteresis comparator 341. The one-shot circuit 342 generates the valley pulse signal V_Pulse at the output terminal.

Figure 6:
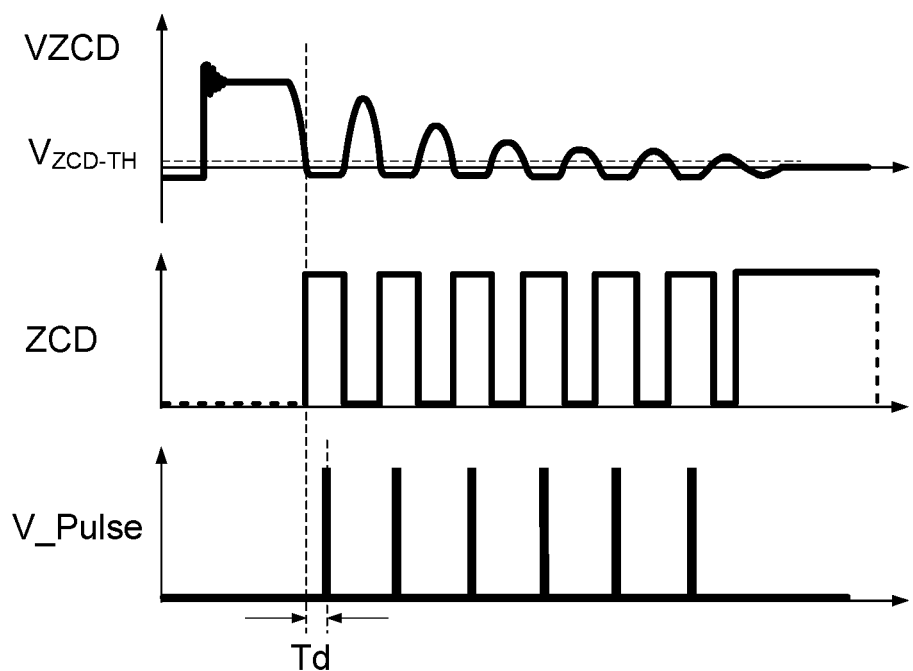
FIG. 6 illustrates working waveforms of a valley detection circuit 304 in accordance with an embodiment of the present invention.

FIG. 6 illustrates working waveforms of a valley detection circuit 304 in accordance with an embodiment of the present invention. In the example of FIG. 6, in order to valley switching, a delay circuit is introduced to provide a delay time Td, and is coupled between the output terminal of the hysteresis comparator 341 and the input terminal of the one-shot 342.

The valley detection circuit 304 is not limited to the embodiment shown in FIG. 4. in other embodiments, the valley detection circuit may also include other circuits to generate the valley pulse signal V_Pulse, for example, the valley detection circuit 304 can generate the valley pulse signal V_Pulse by detecting the valley of the voltage VDS across the main switch MP during the off time of the main switch MP.

Referring still to FIG. 4, the valley selection circuit 305 has a first input terminal, a second input terminal and an output terminal, wherein the first input terminal is configured to receive the valley pulse signal V_Pulse, the second input terminal is configured to receive the pulse frequency modulation signal PFM. Based on the pulse frequency modulation signal PFM and the last cycle valley number V_LOCK(n−1), the valley selection circuit 305 generates the target valley number V_LOCK(n) and the valley enable signal VEN corresponding to the target valley number V_LOCK(n). In one embodiment, the valley selection circuit 305 counts the number of the pulses of the valley pulse signal V_Pulse during the period from when the main switch FS is turned on to when the rising edge of the pulse frequency modulation signal PFM arrives, and compares the counted number with the last cycle valley number V_LOCK (n−1), and generates the target valley number V_LOCK(n) based on the comparison result.

In the example of FIG. 4, the valley selection circuit 305 comprises a counter 350, a register 351, a targer valley number generator 352 and a digital comparator 353. The counter 350 has a clock terminal, a reset terminal and an output terminal, wherein the clock terminal is configured to receive the valley pulse signal V_Pulse, the reset terminal is configured to receive the frequency control signal FS. The counter 350 starts counting the number of pulses of the valley pulse signal V_Pulse when the main switch MP is turned on and output a first count V_CNT at the output terminal. The register 351 has an input terminal, a clock terminal and an output terminal, wherein the input terminal is configured to receive the first count V_CNT, the clock terminal is configured to receive the pulse frequency modulation signal PFM. The register 351 is configured to record the number of pulses of the valley pulse signal V_Pulse during the period from when the main switch MP is turned on to when the rising edge of the pulse frequency modulation signal PFM arrives, and output a second count V_PFM. The target valley number generator 352 is configured to compare the second count V_PFM with the last cycle valley number V_LOCK(n−1) and provide the target valley number V_LOCK(n) based on the comparison. The digital comparator 353 is configured to generate the valley enable signal VEN by comparing the first count V_CNT and the target valley number V_LOCK(n), wherein when the first count V_CNT exceeds the target valley number V_LOCK (n), the valley enable signal VEN is asserted.

In the example of FIG. 4, the target valley generator 353 comprises a first multiplexer 521, a second multiplexer 522 and a register 523. In other embodiment, the target valley number generator 352 can comprises other digital circuits. When the second count V_PFM is less than the last cycle valley number V_LOCK(n−1), the first multiplexer 521 is configured to work, and the target valley number V_LOCK (n) is equal to V_LOCK(n−1)−1 or V_LOCK(n−1). When the second count V_PFM is higher than the last cycle valley number V_LOCK(n−1), the second multiplexer 522 is configured to work, and the target valley number V_LOCK(n) is equal to V_LOCK(n−1)+1 or V_LOCK(n−1).

In one embodiment, when the last cycle valley number V_LOCK(n−1) is greater than 3 and is greater than the second count V_PFM by 2, the target valley number V_LOCK(n) is equal to V_LOCK(n−1)−1, otherwise, the target valley number V_LOCK(n)=V_LOCK(n−1).

Figure 7:
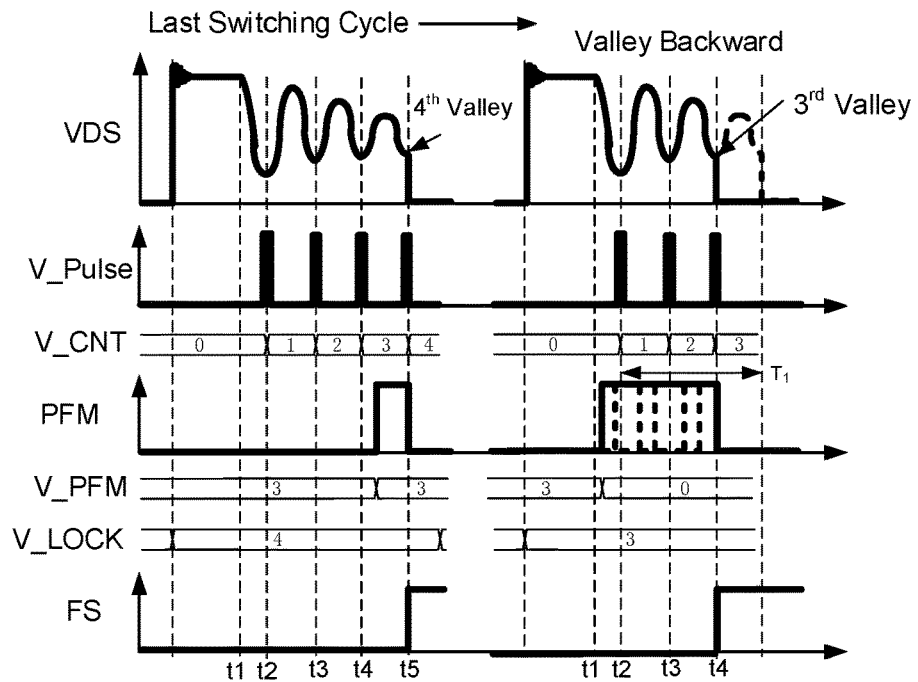
FIG. 7 illustrates working waveforms of a valley selection circuit 305 in accordance with an embodiment of the present invention.

FIG. 7 illustrates working waveforms of a valley selection circuit 305 in accordance with an embodiment of the present invention. As shown in FIG. 7, the last cycle valley number V_LOCK(n−1)=4, the second count V_PFM=0. If the second count V_PFM<V_LOCK(n−1), the target valley number V_LOCK(n) will be equal to V_LOCK(n−1)−1 or V_LOCK(n−1), the valley switching is ready to move backward. In the example of FIG. 7, V_LOCK(n−1)−V_PFM=4, and thus the target valley number V_LOCK(n) =3. At the third valley point, the valley enable signal VEN changes from logic low into logic high, the frequency control signal FS also changes from logic low to logic high. As shown in FIG. 7, a hysteresis time T1 is inserted before valley move backward.

Figure 8:
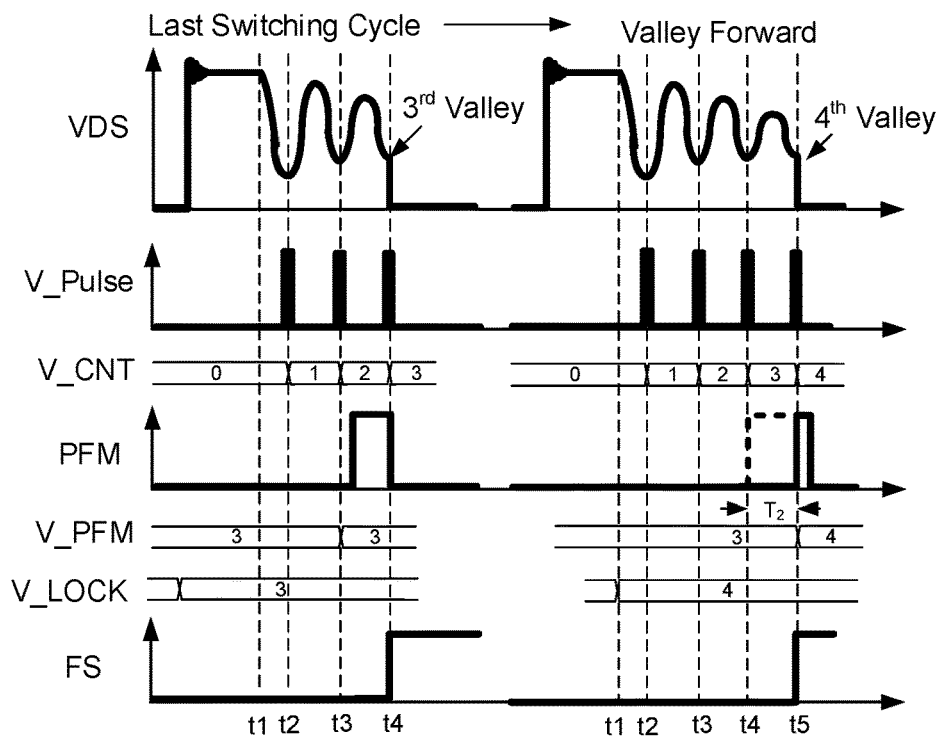
FIG. 8 illustrates working waveforms of a valley selection circuit 305 in accordance with another embodiment of the present invention.

FIG. 8 illustrates working waveforms of a valley selection circuit 305 in accordance with another embodiment of the present invention. As shown in FIG. 8, the last cycle valley number V_LOCK(n−1)=3. When the rising edge of the pulse frequency modulation signal PFM arrives, the second count V_PFM=4 in the subsequent switching cycle. This means the second count V_PFM is higher than the last cycle valley number V_LOCK(n−1), the target valley number V_LOCK(n) will be equal to V_LOCK(n−1)+1 or V_LOCK(n−1), the valley switching is ready to move forward. In the example of FIG. 8, V_PFM−V_LOCK(n−1)=1, and thus the target valley number V_LOCK(n)=4. At the fourth valley point, the valley enable signal VEN changes from logic low into logic high, the frequency control signal FS also changes from logic low into logic high. As shown in FIG. 8, a second hysteresis time T2 is inserted before valley move forward. In one embodiment, the first hysteresis time T1 is longer than the second hysteresis time T2.

Figure 9:
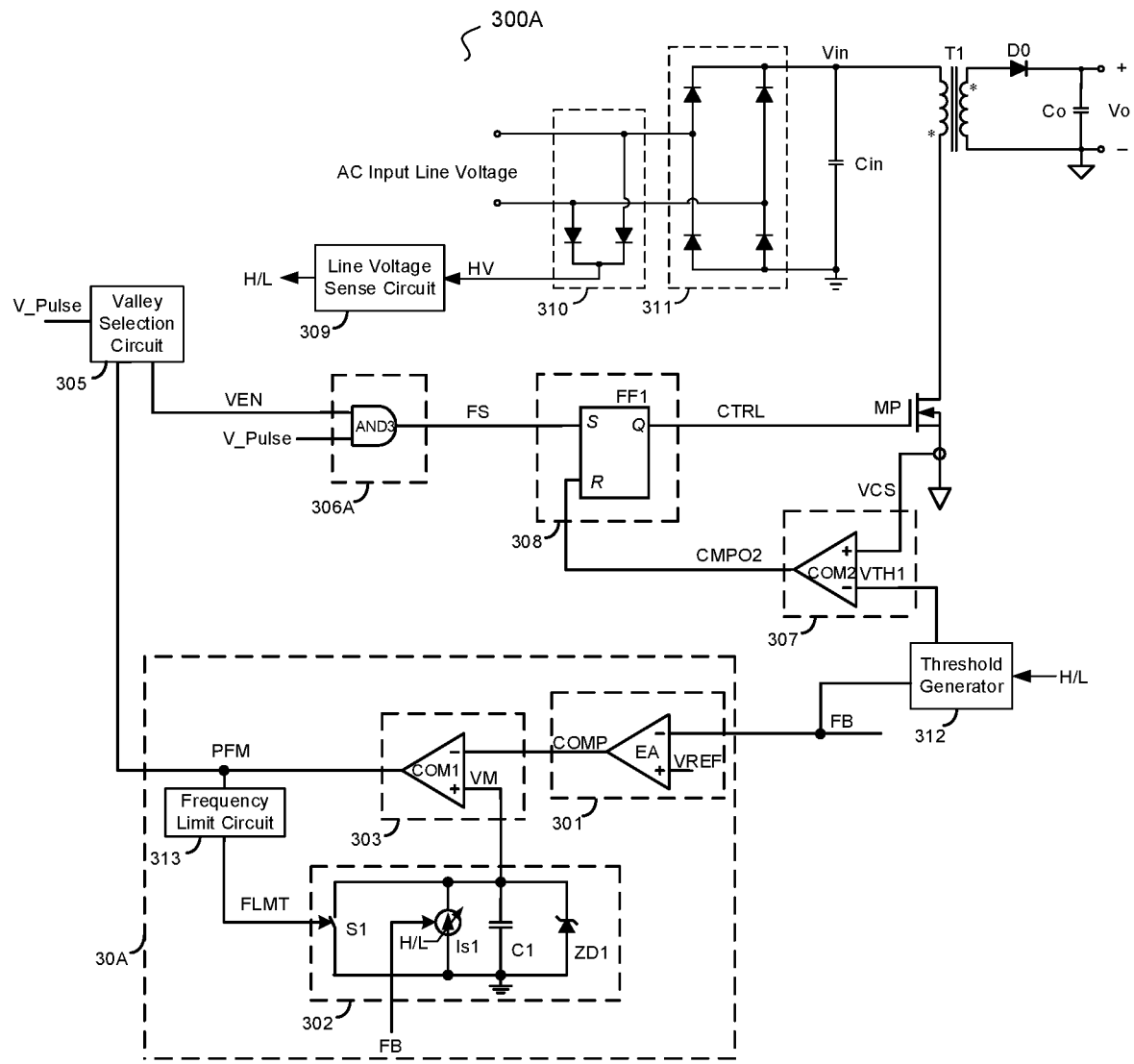
FIG. 9 illustrates a switching converter 300A with quasi-resonant control in accordance with another embodiment of the present invention.

FIG. 9 illustrates a switching converter 300A with quasi-resonant control in accordance with another embodiment of the present invention. Compared with the switching converter 300 in the FIG. 4, the switching converter 300A shown in FIG. 9 has a different pulse frequency modulation circuit 30A and a different frequency control circuit 306A.

In the example of FIG. 9, the frequency control circuit 306A comprises an AND gate AND3. The AND gate AND3 has a first input terminal, a second input terminal and an output terminal, wherein the first input terminal is coupled to the valley selection circuit 305 to receive the valley enable signal VEN, the second input terminal is configured to receive the valley pulse signal V_Pulse. The AND gate AND3 provides the frequency control signal FS at the output terminal.

In addition, in order to limit the frequency of the switching converter 300A, a frequency limit circuit 313 is coupled between the output terminal of the first comparison circuit 303 and the modulation signal generator 302. The frequency limit circuit 313 has an input terminal and an output terminal, wherein the input terminal is configured to receive the pulse frequency modulation signal PFM, the output terminal is configured to provide a frequency limit signal FLMT to the modulation signal generator 302. The frequency limit circuit 313 is configured to adjust the modulation signal VM based on the frequency limit signal FLMT, to limit the maximum frequency of the pulse frequency modulation signal PFM. Therefore, the maximum switching frequency of the main switch MP can be limited.

Figure 10:
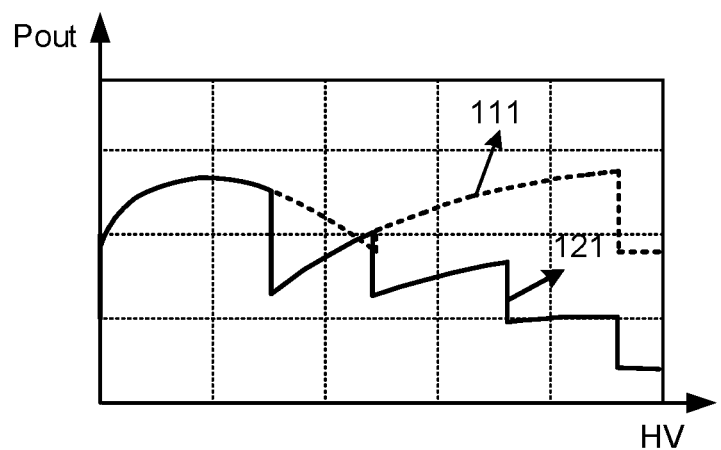
FIG. 10 illustrates comparison curves of a maximum output power of the switching converter 300 shown in FIG. 4 and the switching converter 300A shown in FIG. 9 in accordance with an embodiment of the present invention.

FIG. 10 illustrates comparison curves of a maximum output power of the switching converter 300 shown in FIG. 4 and the switching converter 300A shown in FIG. 9 in accordance with an embodiment of the present invention.

The switching converter 300A shown in FIG. 9 has a different frequency limiting solution from that of the switching converter 300 shown in FIG. 4. The pulse frequency modulation signal PFM shown in FIG. 4 is only configured to generate the target valley number V_LOCK(n), is not used to limit the switching frequency of the main switch MP. In fact, the switching frequency of the main switch MP is limited by the frequency limiting signal Fsmax generated by the frequency limiter 360. However, the pulse frequency modulation signal PFM shown in FIG. 9 is not only used to generate the target valley number V_LOCK(n), but also to limit the switching frequency of the switching converter 300.

As shown in FIG. 10, the switching converter 300 of FIG. 4 has the relationship curve 111 between the maximum output power Pout and the line voltage (or the rectified signal HV). The switching converter 300A of FIG. 9 has a relationship curve 121 between the maximum output power Pout and the line voltage (or the rectified signal HV). Based on the comparison of FIG. 10, the fluctuation of the maximum output power with the embodiment shown in FIG. 4 is smaller, and the curve of the maximum output power is better under a wide-range input line voltages.

The embodiments discussed above are all related to switching converters that have quasi-resonant control. The embodiments of the present invention also can be applied to a switching converter that can work in multi-mode including both CCM, QR mode and/or DCM. In one embodiment, the switching converter further comprises a mode determination circuit and a ramp compensation circuit. The mode determination circuit is configured to generate a ramp compensation enable signal according to the working mode of the switching converter. The ramp compensation circuit is configured to determine whether to compensate the current sensing signal VCS based on the compensation enable signal.

Figure 11:
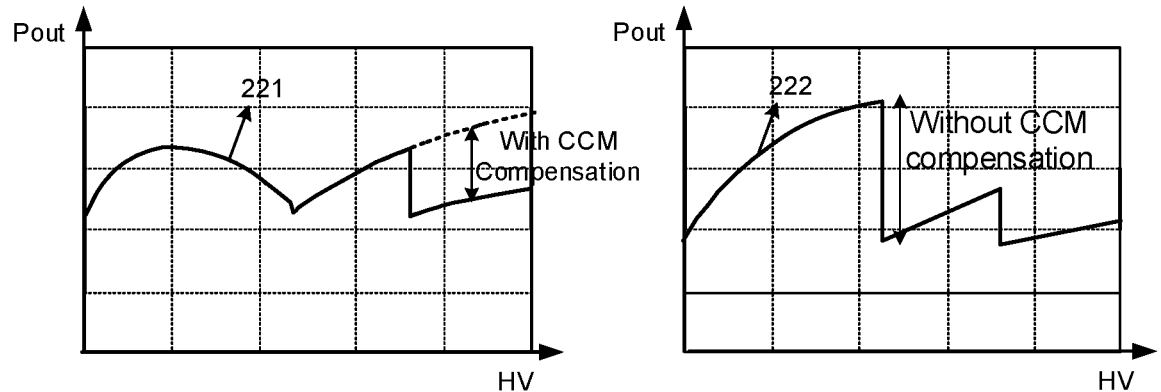
FIG. 11 illustrates comparison curves of a maximum output power of the switching converter with ramp compensation and the switching converter without ramp compensation in accordance with an embodiment of the present invention.

FIG. 11 illustrates comparison curves of a maximum output power of the switching converter with ramp compensation and the switching converter without ramp compensation in accordance with an embodiment of the present invention.

As shown in FIG. 11, the curve 221 represents the maximum output power curve with ramp compensation under both CCM mode and QR mode. The curve 222 represents the maximum output power curve without ramp compensation.

Based on the comparison of FIG. 11, when the switching converter works in CCM mode, ramp compensation to the current sensing signal VCS can flat the maximum output power curve, which is helpful to the circuit design of the engineer.

In another embodiment, the switching converter can only work in quasi-resonant control. The ramp compensation to the current sensing signal VCS is enabled when the target valley number is equal to 1, and the ramp compensation to the current sensing signal VCS is disabled when target valley number is greater than 1.

Figure 12:
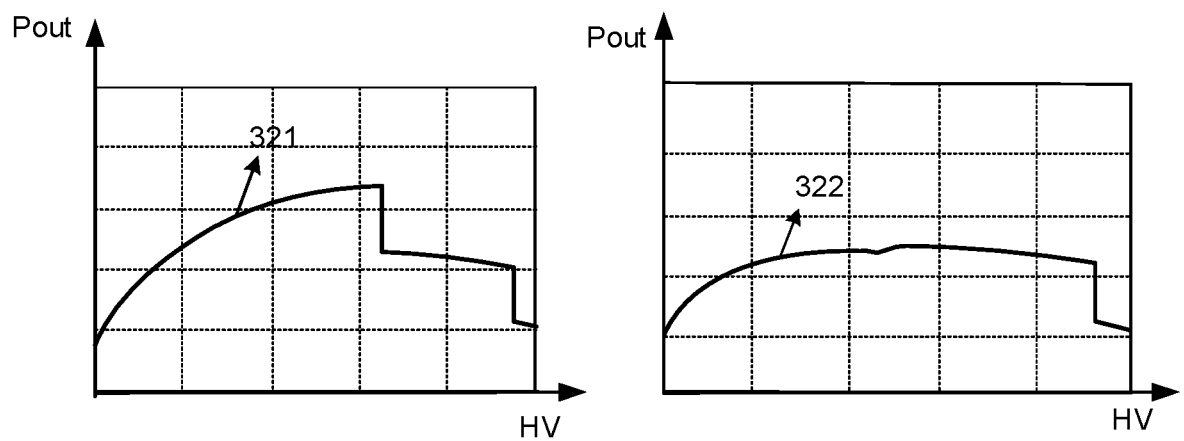
FIG. 12 illustrates comparison curves of a maximum output power of the switching converter with ramp compensation and the switching converter without ramp compensation in accordance with another embodiment of the present invention.

FIG. 12 illustrates comparison curves of a maximum output power of the switching converter with ramp compensation and the switching converter without ramp compensation in accordance with another embodiment of the present invention.

As shown in FIG. 12, the curve 321 represents the maximum output power curve of the switching converter with ramp compensation at any valley. The curve 322 represents the maximum output power curve of the switching converter only ramp compensation to the current sensing signal VCS when the valley number is 1. Based on the comparison, when the switching converter works in quasi-resonant mode, the ramp compensation is only enabled when the target valley number is 1, which can make the output power curve flatter. And thus the fluctuation of the output power can be reduced.

Figure 13:
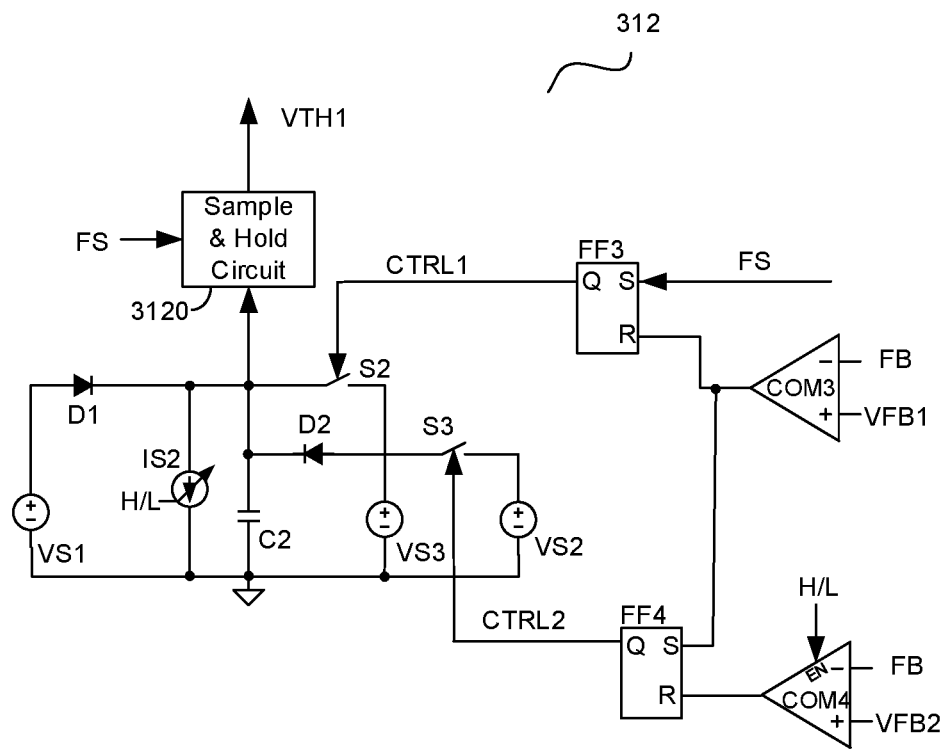
FIG. 13 illustrates a threshold generator 312 shown in FIG. 4 in accordance with an embodiment of the present invention.

FIG. 13 illustrates a threshold generator 312 shown in FIG. 4 in accordance with another embodiment of the present invention. In order to improve efficiency under different input line voltages, a threshold generator 312 is configured to provide the first threshold voltage VTH1 varying with the feedback signal FB.

The threshold generator 312 comprises a sample-and-hold circuit 3120, a comparator COM3, a comparator COM4, a flip-flop FF3, a flip-flop FF4, a capacitor C2, a current source IS2, three voltage sources VS1~VS3, diodes D1 and D2, and switches S2 and S3. Each of the three voltage sources VS1~VS3 has a positive terminal and a negative terminal coupled to the ground. The comparator COM3 has a first input terminal, a second input terminal and an output terminal, wherein the first input terminal is configured to receive the feedback signal FB, the second input terminal is configured to receive a first feedback reference voltage VFB1. The comparator COM3 compares the feedback signal FB with the first feedback reference voltage VFB1, and outputs a first comparison signal at an output terminal.

The comparator COM4 has a first input terminal, a second input terminal, an enable terminal and an output terminal, wherein the first input terminal is configured to receive the feedback signal FB, the second input terminal is configured to receive a second feedback reference voltage VFB2, the enable terminal is configured to receive the line mode signal H/L. Based on the line mode signal H/L, the comparator COM4 compares the feedback signal FB and the second feedback reference voltage VFB2, and generates a second comparison signal at the output terminal. The flip-flop FF3 has a set terminal to receive the frequency control signal PFM, and a reset terminal to receive the first comparison signal and an output terminal to provide a first control signal CTRL1. The flip-flop FF4 has a set terminal to receive the first comparison signal, and a reset terminal to receive the second comparison signal, and an output terminal to provide a second control signal CTRL2. The capacitor C2 has a first terminal, and a second terminal coupled to the ground, The current source IS2 has an input terminal, a control terminal and an output terminal, wherein the input terminal is coupled to a first terminal of the capacitor C2, the control terminal is configured to receive the line mode signal H/L, the output terminal is coupled to the ground. The diode D1 has an anode and a cathode, wherein the anode is coupled to the positive terminal of the voltage source VS1, the cathode is coupled to the first terminal of the capacitor C2, The switch S2 has a first terminal, a second terminal and a control terminal, wherein the first terminal is coupled to the first terminal of the capacitor C2, the second terminal is coupled to the positive terminal od the voltage source VS3, the control terminal is coupled to the output terminal of the flip-flop FF3 to receive the first control signal CTRL2. The diode D2 has an anode and a cathode, wherein the anode is coupled to the first terminal of the switch S3, the cathode is coupled to the first terminal of the capacitor C2.

The sample-and-hold circuit 3120 has a first input terminal, a second input terminal and output terminal, wherein the first input terminal is configured to receive the frequency control signal FS, the second input terminal is coupled to the first terminal of the capacitor C2 to receive the voltage across the capacitor C2. The sample-and-hold circuit 3120 samples and holds the voltage across the capacitor C2 based on the frequency control signal FS, and generates the first threshold voltage VTH1.

Figure 14:
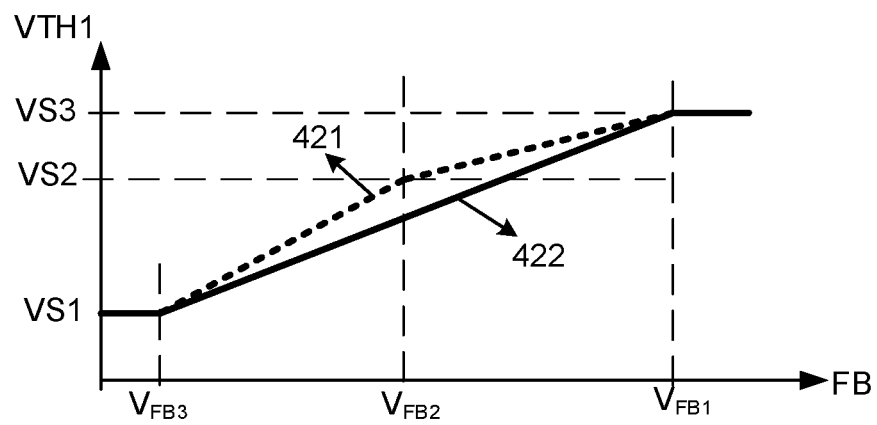
FIG. 14 illustrates a relationship curve of the first threshold voltage VTH1 and the feedback signal FB in accordance with an embodiment of the present invention.

FIG. 14 illustrates a relationship curve of the first threshold voltage VTH1 and the feedback signal FB in accordance with an embodiment of the present invention. As shown in FIG. 14, the curve 421 represents the relationship curve in the high line mode, and the curve 422 represents the relationship curve in the low line mode.

When the frequency control signal FS changes from logic low into logic high, the flip-fop FF3 is set, the switch S2 is turned on, the voltage across the capacitor C2 is equal to the voltage provided by the voltage source VS3. If the feedback signal FB is higher than the first feedback reference voltage VFB1, the flip-flop FF3 will not be reset and keeps the switch S2 on, and the voltage across the capacitor C2 is kept unchanged. The first threshold voltage VTH1 equals to the voltage of the voltage source VS3.

As 422 shown in FIG. 14, in the low line mode, the line mode signal H/L is logic low, the flip-flop FF4 is disabled. When the feedback signal FB is higher than the third feedback reference voltage VFB3 and less than the first feedback reference voltage VFB1, the flip-flop FF3 is reset, the switch S2 is turned off. The current source IS2 is configured to discharge the capacitor C2 and the voltage across the capacitor C2 starts to decrease. The current ability provided by the current source IS2 can be adjusted based on the line input voltage, and the first threshold voltage VTH1 decreases with the feedback signal FB. When the feedback signal FB decrease to reach the third feedback reference voltage VFB3, the voltage across the capacitor C2 further decreases to reach the voltage of the voltage source VS1 due to the discharge of the current source IS2, the diode D1 is turned on, the voltage across the capacitor C2 is clamped to the voltage of the first voltage source VS1. At last, when the feedback signal FB is less than the third feedback reference voltage VFB3, the first threshold voltage VTH1 is equal to the voltage of the first voltage source VS1.

As 422 shown in FIG. 14, in the high line mode, the line mode signal H/L is logic high to enable the flip-flop FF4. When the feedback signal FB is higher than the second feedback reference voltage VFB2 and is less than the first feedback reference voltage VFB1, the flip-flop FF3 is reset, the switch S2 is turned off, the flip-flop FF3 is set and the switch S3 is turned on. The current source IS2 discharges the capacitor C2, the voltage across the capacitor C2 decreases gradually. The current source IS2 can be controlled according to the line input voltage. The first threshold voltage VTH1 decreases with the feedback signal FB, until the voltage across the capacitor C2 decreases to reach the voltage of the voltage source VS2, the diode D2 is turned on. When the feedback signal FB is higher than the third feedback reference voltage VFB3 and is less than the second feedback reference voltage VFB2, the flip-flop FF4 is reset, the switch S3 is turned off. The current source IS2 discharges the capacitor C2, the voltage across the capacitor C2 decreases gradually. The first threshold voltage VTH1 decreases with the feedback signal FB. When the feedback signal FB decreases to the third feedback reference voltage VFB3, the voltage across the capacitor C2 will decreases to reach the voltage of the first voltage source VS1 due to the discharging of the current source IS2, and the diode D1 is turned on, the voltage across the capacitor C2 is clamped to the voltage of the first voltage source VS1. At last, when the feedback signal FB is less than the third feedback reference voltage, the first threshold voltage VTH1 is equal to the voltage of the first voltage source VS1.

Figure 15:
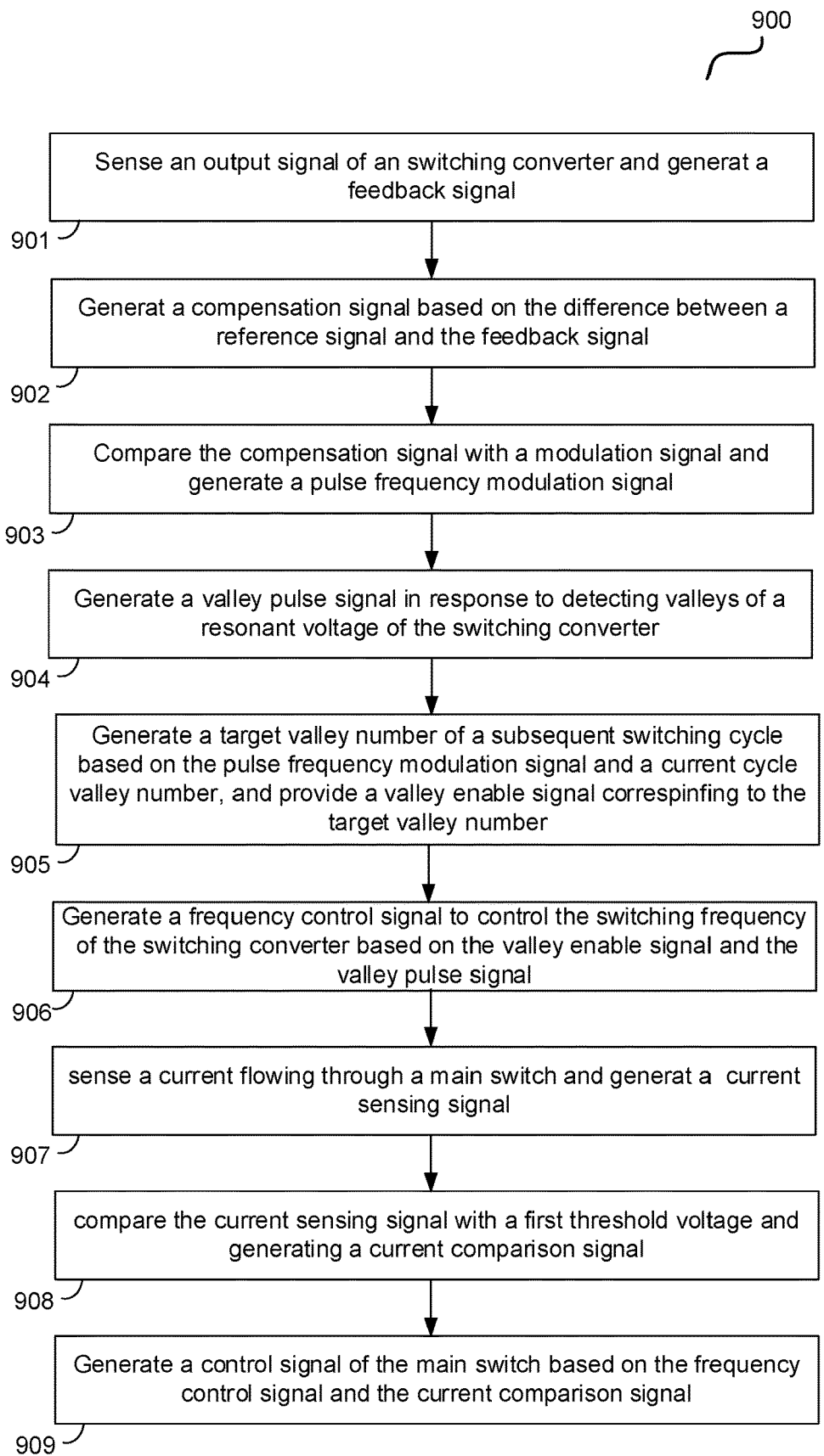
FIG. 15 illustrates a workflow for a control method 900 of a quasi-resonant control switching converter in accordance with an embodiment of the present invention.

FIG. 15 illustrates a workflow for a control method 900 of a quasi-resonant control switching converter in accordance with an embodiment of the present invention. The switching converter has a main switch and an energy storage component coupled to the main switch, the control method comprises steps 901~900.

At step 901, an output signal of the switching converter is sensed and a feedback signal is generated.

At step 902, a compensation signal is generated based on the difference between a reference signal and the feedback signal.

At step 903, the compensation signal is compared with a modulation signal and a pulse frequency modulation signal is generated.

In one embodiment, steps of generating the modulation signal comprises: starting charging a first capacitor with a first current source to generate the modulation signal when the main switch is turned off.

At step 904, a valley pulse signal is generated by detecting valleys of a resonant voltage of the switching converter.

At step 905, a target valley number is generated based on the pulse frequency modulation signal and a last cycle valley number and a valley enable signal corresponding to the target valley number is generated.

In one embodiment, the number of pulses of the valley pulse signal during the period from when the main switch is turned on to when the rising edge of the pulse frequency modulation signal comes is counted and the counter number is compared with the current cycle target number, and the target valley number is generated based on the comparison.

In a further embodiment, steps of generating the target valley number comprises: start counting the number of pulses of the valley pulse signal when the first switch is turned on and providing a first count; counting the number of pulses of the valley pulse signal during the period from when the first switch is turned on to when the rising edge of the pulse frequency modulation signal comes and providing a second count; and the target valley number is generated based on the comparison of the second count and the last cycle valley number.

In one embodiment, the valley enable signal is generated by comparing the first count and the target valley number, wherein when the first count exceeds the target valley number, the valley enable signal is asserted.

In one embodiment, when the second count is less than the last cycle valley number, the target valley number is equal to the last cycle valley number or the last cycle valley number minus 1, the valley switching is ready to move backward. When the second count is higher than the last cycle valley number, the, the target valley number is equal to the last cycle valley number or the last cycle valley number plus 1, the valley switching is ready to move forward.

At step 906, a frequency control signal is generated to control the switching frequency of the main switch based on the valley enable signal and the valley pulse signal.

In one embodiment, the switching frequency of the main switch is further limited by a frequency limiting signal, wherein the frequency limiting signal is reset when the main switch is turned on and the main switch can be turned on again until a minimum predetermined time ends.

In one embodiment, the control method 900 further comprises steps 907~909.

At step 907, a current sensing signal is generated by sensing a current flowing through the main switch.

At step 908, a current comparison signal is generated to compare the current sensing signal and a first threshold voltage.

In one embodiment, the first threshold voltage has a maximum value when the feedback signal is greater than a first feedback reference voltage; the first threshold voltage decreases with a first slope as the feedback signal decreases when the feedback signal is between the first feedback reference voltage and a second feedback reference voltage and the line mode signal indicates the high line mode of the line voltage; the first threshold voltage decreases with a second slope as the feedback signal decreases when the feedback signal is between the second feedback reference voltage and a third feedback reference voltage and the line mode signal indicates the high line mode of the line voltage; the first threshold voltage decreases with a third slope as the feedback signal decreases when the feedback signal is between the first feedback reference voltage and the third feedback reference voltage and the line mode signal indicates the low line mode of the line voltage, wherein the third slope is less than the second slope; and the first threshold voltage has a minimum value when the feedback signal is less than the third feedback reference voltage.

At step 909, a control signal is generated to control the main switch based on the frequency control signal and the current comparison signal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a switching converter having a first switch and an energy storage component coupled to the first switch, the controller comprising:

an error amplifying circuit configured to generate a compensation signal based on the difference between a reference signal and a feedback signal indicative of an output signal of the switching converter;

a first comparison circuit configured to compare the compensation signal with a modulation signal generated by a modulation signal generator and generate a pulse frequency modulation signal;

a valley detection circuit configured to detect valleys of a resonant voltage of the switching converter and generate a valley pulse signal;

a valley selection circuit configured to receive the pulse frequency modulation signal and the valley pulse signal, the valley selection circuit generates a target valley number of a subsequent switching cycle and a valley enable signal corresponding to the target valley number based on the pulse frequency modulation signal and the valley pulse signal; and a frequency control circuit configured to generate a frequency control signal to control the switching frequency of the first switch based on the valley pulse signal and the valley enable signal.

2. The controller of claim 1, wherein the valley selection circuit compares the number of pulses of the valley pulse signal during the period from when the first switch is turned on to when the rising edge of the pulse frequency modulation signal arrives with a last cycle valley number, and generates the target valley number based on the comparison.

3. The controller of claim 2, wherein the valley selection circuit comprises:
a counter configured to start counting the number of pulses of the valley pulse signal when the first switch is turned on and output a first count;
a register configured to record the number of pulses of the valley pulse signal during the period from when the first switch is turned on to when the rising edge of the pulse frequency modulation signal arrives, and output a second count;
a target valley number generator configured to compare the second count with the last cycle valley number and provide the target valley number; and
a digital comparator configured to generate the valley enable signal by comparing the first count and the target valley number, wherein when the first count exceeds the target valley number, the valley enable signal is asserted.

4. The controller of claim 2, wherein when the last cycle valley number is greater than 3 and is greater than the second count by 2, the target valley number is equal to the last cycle valley number minus 1, otherwise, the target valley number is equal to the last cycle valley number.

5. The controller of claim 2, wherein the controller further comprising:
a second comparison circuit configured to compare a current sensing signal indicative of a current flowing through the first switch and a first threshold voltage and generate a current comparison signal; and
a logic circuit configured to generate a control signal to control the first switch based on the frequency control signal and the current comparison signal.

6. The controller of claim 5, wherein the modulation signal generator comprises a first current source and a first capacitor, the first current source charges the first capacitor for generating the modulation signal when the first switch is turned off, and wherein the modulation signal is further adjusted based on an input line voltage.

7. The controller of claim 6, further comprises:
a threshold generator having a first input terminal configured to receive the feedback signal, a second input terminal configured to receive a line mode signal indicative of a high or a low line mode of an input line voltage, and an output terminal, wherein the threshold generator generates the first threshold voltage based on the feedback signal and the line mode signal.

8. The controller of claim 7, wherein the threshold generator comprises:
a third comparison circuit configured to compare the feedback signal and a first feedback reference voltage and generate a first compassion signal;
a fourth comparison circuit configured to compare the feedback signal and a second feedback reference voltage and generate a second compassion signal based on the line mode signal;
a first flip-flop having a set terminal to receive the frequency control signal, and a reset terminal to receive the first comparison signal and an output terminal to provide a first control signal;
a second flip-flop having a set terminal to receive the first comparison signal, a reset terminal to receive the second comparison signal, and an output terminal to provide a second control signal;
a second capacitor having a first terminal and a second terminal coupled to ground;
a second current source having an input terminal coupled to the first terminal of the second capacitor, a control terminal configured to receive the line mode signal, and an output terminal coupled to the ground;
a first diode having an anode coupled to a positive terminal of a first voltage source and a cathode coupled to the second terminal of the second capacitor, wherein a negative terminal of the first voltage source is coupled to the ground;
a second switch having a first terminal, a second terminal and a control terminal, wherein the first terminal is coupled to the first terminal of the second capacitor, the second terminal is coupled to a positive terminal of a third voltage source, the control terminal is coupled to output terminal of the first flip-flop to receive the first control signal;
a third switch having a first terminal, a second terminal and a control terminal, wherein the second terminal is coupled to a positive terminal of a second voltage source, the control terminal is coupled to output terminal of the second flip-flop to receive the second control signal;
a second diode having an anode coupled to the positive terminal of the third voltage source and a cathode coupled to the first terminal of the second capacitor; and
a sample-and-hold circuit having a first input terminal to receive the frequency control signal, a second input terminal to receive a voltage across the second capacitor and an output terminal, the sample-and-hold circuit samples and holds the voltage across the second capacitor based on the frequency control signal and provides the first threshold voltage at the output terminal.

9. The controller of claim 5, further comprises:
a frequency limiter configured to generate a frequency limiting signal to limit the maximum frequency of the main switch, wherein the frequency limiting signal is reset when the main switch is turned on, and the main switch is not be turned on again until a predetermined time ends.

10. The controller of claim 5, further comprises:
a mode determination circuit configured to generate a ramp compensation enable signal according to the working mode of the switching converter; and
a ramp compensation circuit configured to determine whether to compensate the current sensing signal based on the compensation enable signal.

11. A switching converter, comprising:
an energy storage component;
a first switch coupled to the energy storage component;
an error amplifying circuit configured to generate a compensation signal based on the difference between a reference signal and a feedback signal indicative of an output voltage of the switching converter;
a modulation signal generator configured to generate a modulation signal;
a first comparison circuit configured to compare the compensation signal with the modulation signal and generate a pulse frequency modulation signal;
a valley detection circuit configured to detect valleys of a resonant voltage of the switching converter and generate a valley pulse signal;
a valley selection circuit configured to receive the pulse frequency modulation signal and the valley pulse signal, the valley selection circuit generates a target valley number of a subsequent switching cycle and a valley enable signal corresponding to the target valley number based on the pulse frequency modulation signal and the valley pulse signal; and a frequency control circuit configured to generate a frequency control signal to control the switching frequency of the first switch based on the valley pulse signal and the valley enable signal.

12. The switching converter of claim 11, wherein the valley selection circuit compares the number of pulses of the valley pulse signal during the period from when the first switch is turned on to when the rising edge of the pulse frequency modulation signal arrives with a last cycle valley number, and generates the target valley number based on the comparison.

13. A control method of a switching converter having an energy storage component and a first switch coupled to the energy storage component, the control method comprising:
sensing an output signal of the switching converter and generating a feedback signal;
generating a compensation signal based on the difference between a reference signal and the feedback signal;
comparing the compensation signal with a modulation signal and generating a pulse frequency modulation signal;
detecting valleys of a resonant voltage of the switching converter and generating a valley pulse signal;
generating a target valley number based on the pulse frequency modulation signal and a last cycle valley number and generating a valley enable signal corresponding to the target valley number;
generating a frequency control signal to control the switching frequency of the first switch based on the valley enable signal and the valley pulse signal.

14. The control method of claim 13, wherein generating the target valley number comprising:
counting the number of pulses of the valley pulse signal during the period from when the first switch is turned on to when the rising edge of the pulse frequency modulation signal comes and providing a second count;
comparing the second count with the current cycle target number; and
generating the target valley number based on the comparison of the second count and the last cycle valley number.

15. The control method of claim 14, wherein generating the valley enable signal comprising:
starting counting the number of pulses of the valley pulse signal when the first switch is turned on and providing a first count; and
providing the valley enable signal by comparing the first count and the target valley number, wherein when the first count exceeds the target valley number, the valley enable signal is asserted.

16. The control method of claim 14, wherein:
when the second count is less than the last cycle valley number, the target valley number is equal to the last cycle valley number minus 1 or the last cycle valley number; and
when the second count is greater than the last cycle valley number, the target valley number is equal to the last cycle valley number plus 1 or the last cycle valley number.

17. The control method of claim 16, wherein when the last cycle valley number is greater than 3 and is greater than the second count by 2, the target valley number is equal to the last cycle valley number minus 1, otherwise, the target valley number is equal to the last cycle valley number.

18. The control method of claim 13, wherein the modulation signal is generated by charging a first capacitor with a first current source when the first switch is turned off, wherein the modulation signal is adjusted based on an input line voltage and the feedback signal.

19. The control method of claim 13, further comprising:
generating a frequency limiting signal to limit the maximum switching frequency of the first switch, wherein the frequency limiting signal is reset when the first switch is turned on, and the first switch is not be turned on again until a predetermined time ends.

20. The control method of claim 13, further comprises:
sensing a current flowing through the first switch and generating a current sensing signal;
comparing the current sensing signal with a first threshold voltage and generating a current comparison signal; and
generating a control signal to control the first switch based on the frequency control signal and the current comparison signal.

21. The control method of claim 20, wherein the first threshold voltage and the feedback signal have the following relationships:
the first threshold voltage has a maximum value when the feedback signal is greater than a first feedback reference voltage;
the first threshold voltage decreases with a first slope as the feedback signal decreases when the feedback signal is between the first feedback reference voltage and a second feedback reference voltage and the line mode signal indicates the high line mode of the line voltage;
the first threshold voltage decreases with a second slope as the feedback signal decreases when the feedback signal is between the second feedback reference voltage and a third feedback reference voltage and the line mode signal indicates the high line mode of the line voltage;
the first threshold voltage decreases with a third slope as the feedback signal decreases when the feedback signal is between the first feedback reference voltage and the third feedback reference voltage and the line mode signal indicates the low line mode of the line voltage, wherein the third slope is less than the second slope; and
the first threshold voltage has a minimum value when the feedback signal is less than the third feedback reference voltage.

22. The control method of claim 20, further comprising:
enabling ramp compensation to the current sensing signal when the switching converter works in CCM mode; and
disabling ramp compensation to the current sensing signal when the switching converter works in non-CCM mode.

23. The control method of claim 20, further comprising:
enabling ramp compensation to the current sensing signal when the target valley number is equal to 1; and
disabling ramp compensation to the current sensing signal when target valley number is greater than 1.

* * * * *